(12) United States Patent
Park et al.

(10) Patent No.: US 6,738,124 B2
(45) Date of Patent: May 18, 2004

(54) METHOD FOR FABRICATING LIQUID CRYSTAL DISPLAY PANEL

(75) Inventors: Moo Yeol Park, Taegu-kwangyokshi (KR); Sung Su Jung, Taegu-kwangyokshi (KW)

(73) Assignee: LG. Philips LCD Co., Ltd., Seoul (KR)

( * ) Notice: Subject to any disclaimer, the term of this patent is extended or adjusted under 35 U.S.C. 154(b) by 153 days.

(21) Appl. No.: 10/124,709

(22) Filed: Apr. 18, 2002

(65) Prior Publication Data

US 2003/0169393 A1 Sep. 11, 2003

(30) Foreign Application Priority Data

Mar. 7, 2002 (KR) ......................................... 2002-12056

(51) Int. Cl.⁷ ............................................. G02F 1/1339
(52) U.S. Cl. ....................................................... 349/153
(58) Field of Search .............................. 349/153, 73, 74

(56) References Cited

U.S. PATENT DOCUMENTS

| | | |
|---|---|---|
| 3,978,580 A | 9/1976 | Leupp et al. |
| 4,094,058 A | 6/1978 | Yasutake et al. .......... 29/592 R |
| 4,653,864 A | 3/1987 | Baron et al. |
| 4,691,995 A | 9/1987 | Yamazaki et al. ...... 350/331 R |
| 4,775,225 A | 10/1988 | Tsuboyama et al. |
| 5,247,377 A | 9/1993 | Omeis et al. ................. 359/76 |
| 5,263,888 A | 11/1993 | Ishihara et al. |
| 5,379,139 A | 1/1995 | Sato et al. |
| 5,406,989 A | 4/1995 | Abe |
| 5,499,128 A | 3/1996 | Hasegawa et al. |
| 5,507,323 A | 4/1996 | Abe |
| 5,511,591 A | 4/1996 | Abe ............................. 141/7 |
| 5,539,545 A | 7/1996 | Shimizu et al. |

(List continued on next page.)

FOREIGN PATENT DOCUMENTS

| | | |
|---|---|---|
| EP | 1 003 066 A1 | 5/2000 |
| JP | 51-65656 | 6/1976 |
| JP | 57-38414 | 3/1982 |
| JP | 57-88428 | 6/1982 |
| JP | 58-27126 | 2/1983 |
| JP | 59-57221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55625 | 3/1986 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | 5-127179 | 5/1993 |
| JP | 5-15423 A | 6/1993 |
| JP | 5-265011 | 10/1993 |

(List continued on next page.)

Primary Examiner—Tarifur R. Chowdhury
Assistant Examiner—Richard H. Kim
(74) Attorney, Agent, or Firm—Morgan, Lewis & Bockius LLP

(57) ABSTRACT

A method for fabricating a liquid crystal display panel includes forming a main UV sealant to surround a plurality of unit cells on either one of first and second substrates, the dummy UV sealant formed at an outside of the main UV sealant, dropping at least one droplet of liquid crystal onto either one of the first and second substrates, attaching the first and second substrates, irradiating a UV ray on the attached substrates with masking regions where the dummy UV sealant and at least one scribing line are crossed, thereby bonding the substrates, and cutting the bonded substrates into a plurality of unit cells.

13 Claims, 7 Drawing Sheets

U.S. PATENT DOCUMENTS

| | | | |
|---|---|---|---|
| 5,548,429 A | 8/1996 | Tsujita | |
| 5,642,214 A | 6/1997 | Ishii et al. | 349/96 |
| 5,680,189 A | 10/1997 | Shimizu et al. | |
| 5,742,370 A | 4/1998 | Kim et al. | 349/124 |
| 5,757,451 A | 5/1998 | Miyazaki et al. | |
| 5,852,484 A | 12/1998 | Inoue et al. | |
| 5,854,664 A | 12/1998 | Inoue et al. | |
| 5,861,932 A | 1/1999 | Inata et al. | |
| 5,875,922 A | 3/1999 | Chastine et al. | 222/1 |
| 5,952,676 A | 9/1999 | Sato et al. | |
| 5,956,112 A | 9/1999 | Fujimori et al. | |
| 6,001,203 A | 12/1999 | Yamada et al. | |
| 6,010,384 A * | 1/2000 | Nishino et al. | 445/24 |
| 6,011,609 A | 1/2000 | Kato et al. | 349/190 |
| 6,016,178 A | 1/2000 | Kataoka et al. | 349/117 |
| 6,016,181 A | 1/2000 | Shimada | |
| 6,055,035 A | 4/2000 | von Gutfeld et al. | 349/187 |
| 6,163,357 A | 12/2000 | Nakamura | 349/155 |
| 6,219,126 B1 | 4/2001 | Von Gutfeld | |
| 6,226,067 B1 | 5/2001 | Nishiguchi et al. | 349/155 |
| 6,236,445 B1 | 5/2001 | Foschaar et al. | |
| 6,304,306 B1 | 10/2001 | Shiomi et al. | 349/88 |
| 6,304,311 B1 | 10/2001 | Egami et al. | 349/189 |
| 6,337,730 B1 | 1/2002 | Ozaki et al. | |
| 6,414,722 B1 | 7/2002 | Bramley | 348/565 |
| 2001/0021000 A1 | 9/2001 | Egami | 349/187 |

FOREIGN PATENT DOCUMENTS

| | | |
|---|---|---|
| JP | 5-281557 | 10/1993 |
| JP | 5-281562 | 10/1993 |
| JP | 6-51256 | 2/1994 |
| JP | 6-148657 | 5/1994 |
| JP | 6-160871 | 6/1994 |
| JP | 6-235925 A | 8/1994 |
| JP | 6-265915 | 9/1994 |
| JP | 6-313870 A | 11/1994 |
| JP | 7-84268 A | 3/1995 |
| JP | 7-128674 | 5/1995 |
| JP | 7-181507 | 7/1995 |
| JP | 8-95066 | 4/1996 |
| JP | 8-101395 A | 4/1996 |
| JP | 8-106101 | 4/1996 |
| JP | 8-171094 | 7/1996 |
| JP | 8-190099 | 7/1996 |
| JP | 8-240807 | 9/1996 |
| JP | 9-5762 | 1/1997 |
| JP | 9-26578 | 1/1997 |
| JP | 9-61829 A | 3/1997 |
| JP | 9-73075 | 3/1997 |
| JP | 9-73096 | 3/1997 |
| JP | 9-127528 | 5/1997 |
| JP | 9-230357 | 9/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-177178 A | 6/1998 |
| JP | 10-221700 | 8/1998 |
| JP | 10-282512 | 10/1998 |
| JP | 10-333157 A | 12/1998 |
| JP | 10-333159 A | 12/1998 |
| JP | 11-14953 | 1/1999 |
| JP | 11-38424 | 2/1999 |
| JP | 11-64811 | 3/1999 |
| JP | 11-109388 | 4/1999 |
| JP | 11-133438 A | 5/1999 |
| JP | 11-142864 A | 5/1999 |
| JP | 11-174477 | 7/1999 |
| JP | 11-212045 | 8/1999 |
| JP | 11-248930 A | 9/1999 |
| JP | 11-326922 A | 11/1999 |
| JP | 11-344714 | 12/1999 |
| JP | 2000-2879 A | 1/2000 |
| JP | 2000-29035 | 1/2000 |
| JP | 2000-56311 A | 2/2000 |
| JP | 2000-66165 A | 3/2000 |
| JP | 2000-137235 A | 5/2000 |
| JP | 2000-147528 A | 5/2000 |
| JP | 2000-193988 A | 7/2000 |
| JP | 2000-241824 A | 9/2000 |
| JP | 2000-284295 A | 10/2000 |
| JP | 2000-292799 A | 10/2000 |
| JP | 2000-310759 A | 11/2000 |
| JP | 2000-310784 A | 11/2000 |
| JP | 2000-338501 A | 12/2000 |
| JP | 2001-5401 A | 1/2001 |
| JP | 2001-5405 A | 1/2001 |
| JP | 2001-13506 A | 1/2001 |
| JP | 2001-33793 A | 2/2001 |
| JP | 2001-42341 A | 2/2001 |
| JP | 2001-51284 A | 2/2001 |
| JP | 2001-66615 A | 3/2001 |
| JP | 2001--91727 A | 4/2001 |
| JP | 2001-117105 | 4/2001 |
| JP | 2001-117109 A | 4/2001 |
| JP | 2001-133745 A | 5/2001 |
| JP | 2001-133794 | 5/2001 |
| JP | 2001-133799 A | 5/2001 |
| JP | 2001-142074 | 5/2001 |
| JP | 2001-147437 | 5/2001 |
| JP | 2001-154211 | 6/2001 |
| JP | 2001-166272 A | 6/2001 |
| JP | 2001-166310 A | 6/2001 |
| JP | 2001-183683 A | 7/2001 |
| JP | 2001-201750 A | 7/2001 |
| JP | 2001-209052 A | 8/2001 |
| JP | 2001-209060 A | 8/2001 |
| JP | 2001-215459 A | 8/2001 |
| JP | 2001-222017 A | 8/2001 |
| JP | 2001-235758 A | 8/2001 |
| JP | 2001-255542 | 9/2001 |
| JP | 2001-264782 | 9/2001 |
| JP | 2001-272640 | 10/2001 |
| JP | 2001-281675 A | 10/2001 |
| JP | 2001-281678 A | 10/2001 |
| JP | 2001-282126 A | 10/2001 |
| JP | 2001-305563 A | 10/2001 |
| JP | 2001-330837 A | 11/2001 |
| JP | 2001-330840 | 11/2001 |
| JP | 2001-356353 A | 12/2001 |
| JP | 2001-356354 | 12/2001 |
| JP | 2002-14360 | 1/2002 |
| JP | 2002-23176 | 1/2002 |
| JP | 2002-49045 | 2/2002 |
| JP | 2002-82340 | 3/2002 |
| JP | 2002-90759 | 3/2002 |
| JP | 2002-90760 | 3/2002 |
| JP | 2002-107740 | 4/2002 |
| JP | 2002-122872 | 4/2002 |
| JP | 2002-122873 | 4/2002 |
| JP | 2002-139734 | 5/2002 |
| JP | 2002-202512 | 7/2002 |
| JP | 2002-202514 | 7/2002 |
| JP | 2002-214626 | 7/2002 |
| KR | 2000-0035302 A | 6/2000 |

* cited by examiner

METHOD FOR FABRICATING LIQUID CRYSTAL DISPLAY PANEL

This application claims the benefit of the Korean Application No. P2002-12056 filed on Mar. 7, 2002, which are hereby incorporated by reference.

BACKGROUND OF THE INVENTION

1. Field of the Invention

The present invention relates to a liquid crystal display, and more particularly, to a method for fabricating a liquid crystal display (LCD) panel by a liquid crystal dropping method.

2. Discussion of the Related Art

A thin flat panel display tends to have a thickness of no more than a few centimeters. Particularly, a liquid crystal display (LCD) has a wide scope of applications, such as notebook computers, computer monitors, gauge monitors for space crafts, and air crafts, and the like.

In general, the LCD is provided with a lower substrate having thin film transistors and pixel electrodes formed thereon, an upper substrate opposite to the lower substrate having a black matrix (BM), a color filter layer, and a common electrode, which are formed thereon, and a liquid crystal layer between the two substrates, for driving the liquid crystal by the electric field generated by the power supply applied to the pixel electrode and the common electrode between the substrates, to regulate the transmittivity of the liquid crystal, thereby displaying a picture on the display screen.

In the foregoing LCD, a vacuum injection method has been used for forming the liquid crystal layer between the lower substrate and the upper substrate. In such a method, after the lower substrate and the upper substrate are bonded together, a liquid crystal is injected between the two substrates by using capillary phenomenon and a pressure difference. However, the vacuum injection method takes much time to inject the liquid crystal between the substrates. As a result, productivity is much reduced as the substrate becomes large.

Consequently, a method called a liquid crystal dropping method is suggested for solving such a problem. A method for fabricating an LCD panel by using a related art liquid crystal dropping method will be explained with reference to the attached drawings.

FIGS. 1A to 1E illustrate expanded perspective views showing a method for fabricating an LCD panel by using a related art liquid crystal dropping method. For convenience, only four unit cells are illustrated in the drawings.

Referring to FIG. 1A, a lower substrate 1 and an upper substrate 3 are prepared for the process. A plurality of gate lines and data lines (both not shown) are formed on the lower substrate 1 to cross each other defining pixel regions. A thin film transistor is formed at every crossing point of the gate lines and the data lines. A pixel electrode is formed at every pixel region connected to the thin film transistor.

A black matrix is formed on the upper substrate 3 for shielding a light leakage from the gate lines, the data lines, and the thin film transistor regions. A color filter layer of red, green, and blue is formed thereon. A common electrode is formed thereon in this order. An orientation film is formed on both of the lower substrate 1 and the upper substrate 3 for an initial orientation of the liquid crystal.

In FIG. 1B, a main sealant 7 and a dummy sealant 8 are coated on the lower substrate 1, and a plurality of liquid crystal droplets 5 are positioned thereon to form a liquid crystal layer. Then, spacers (not shown) are spread on the upper substrate 3 for maintaining a cell gap.

The main sealant 7 prevents the liquid crystal from leaking, and bonds the upper and lower substrates. The dummy sealant 8 is formed at the dummy region on the outside of the main sealant 7. The dummy sealant is to protect the main sealant 7.

In the liquid crystal dropping method, the liquid crystal layer is placed between the attached substrates before hardening a sealant. Accordingly, if a thermo-hardening sealant is used to bond the substrates, it may flow and contaminate the liquid crystal during the heating process. Thus, a UV sealant has to be used as a sealant to avoid such a problem.

Referring to FIG. 1C, the lower substrate 1 and the upper substrate 3 are attached to each other. As shown in FIG. 1D, a UV ray is irradiated by using a UV irradiating device 9, to harden the sealant 7 (shown in FIG. 1B), thereby bonding the lower substrate 1 and the upper substrate 3. FIG. 1E illustrates the bonded substrates 1 and 3 are cut into a plurality of unit cells.

FIG. 2 illustrates a process for cutting the substrates into the unit cells. In FIG. 2, a scribing line is formed on the surface of the bonded substrates 1 and 3 using a scriber, such as a diamond pen having a hardness greater than glass, which is a material of the substrates (scribing process). Thereafter, a mechanical impact is given along the scribing line 10 (break process), to cut into a plurality of unit cells. Alternatively, a diamond pen or wheel may be used, to carry out the scribing process and the breaking process in one process, to obtain the unit cell one by one.

FIG. 2 is provided for illustrating the cell cutting process, and the scribing line is not shown in detail. More scribing lines may be formed to remove the dummy region at the outside of the cell in the actual cell cutting process.

FIG. 3 illustrates a plane view of the scribing lines in detail. Particularly, sealants 7 and 8 formed on the lower substrate 1 are illustrated with the scribing lines 10.

Referring to FIG. 3, the scribing line 10 overlaps a portion of the dummy sealant 8 at the region (shown as circles) when the dummy sealant 8 is hardened by the V irradiating process before the cell cutting process.

Consequently, unit cells the hardened dummy sealant 8 does not cause a problem when the scribing and breaking are processed one by one to obtain unit cells. However, when unit cell one by one by the scribing and breaking are processed at the same time, it will be difficult to cut into the unit cell due to the hardened dummy sealant 8.

SUMMARY OF THE INVENTION

Accordingly, the present invention is directed to a method for fabricating a liquid crystal display panel that substantially obviates one or more of problems due to limitations and disadvantages of the related art.

Another object of the present invention is to provide a method for fabricating a liquid crystal display panel, which facilitates an easy cell cutting in the simultaneous scribing and breaking processes.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for fabricating a liquid crystal display panel includes forming a main UV sealant to surround a plurality of unit cells on either one of first and second substrates, the dummy UV sealant being formed at an outside of the main UV sealant, dropping at least one droplet of liquid crystal onto either one of the first and second substrates, attaching the first and second substrates, irradiating a UV ray on the attached substrates with masking regions where the dummy UV sealant and at least one scribing line are crossed, thereby bonding the substrates, and cutting the bonded substrates into a plurality of unit cells.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

FIGS. 4A to 4E are expanded perspective views illustrating a method for fabricating an LCD panel according to a first embodiment of the present invention. Although the drawings illustrate only four unit cells, the number of the unit cells may be varied depending upon the size of the substrate.

Figure 1A:
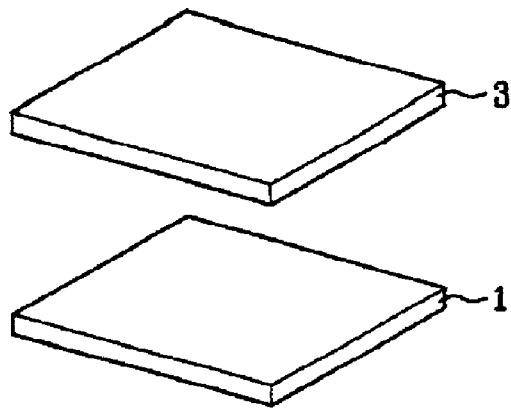
FIGS. 1A to 1E are expanded perspective views illustrating a method for fabricating an LCD panel using a related art liquid crystal dropping method.
Figure 1B:
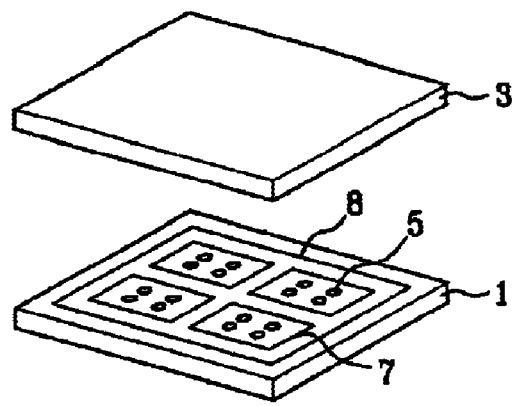
Figure 1C:
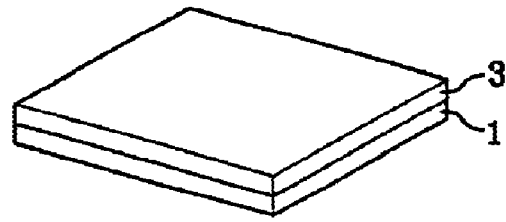
Figure 1D:
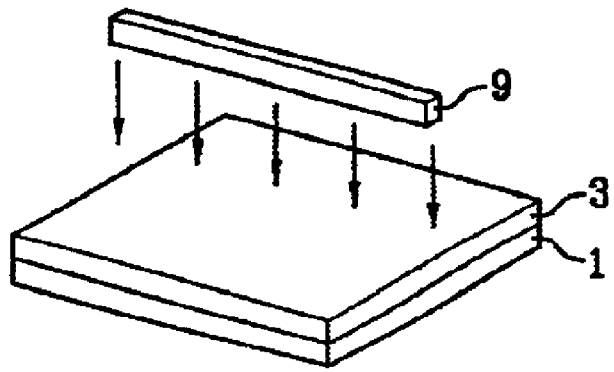
Figure 1E:
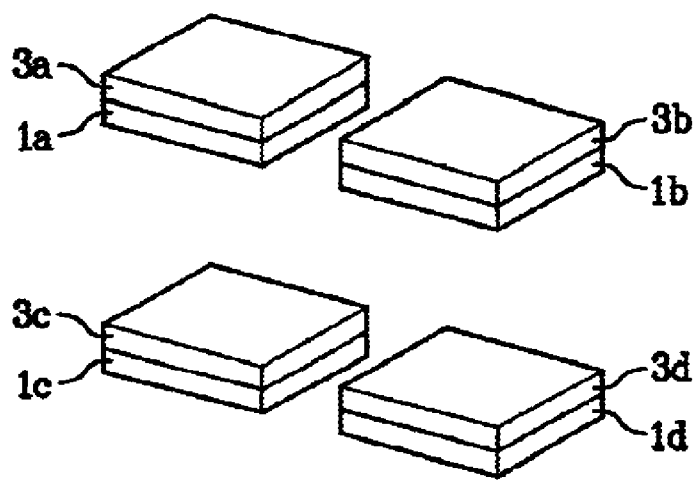
Figure 2:
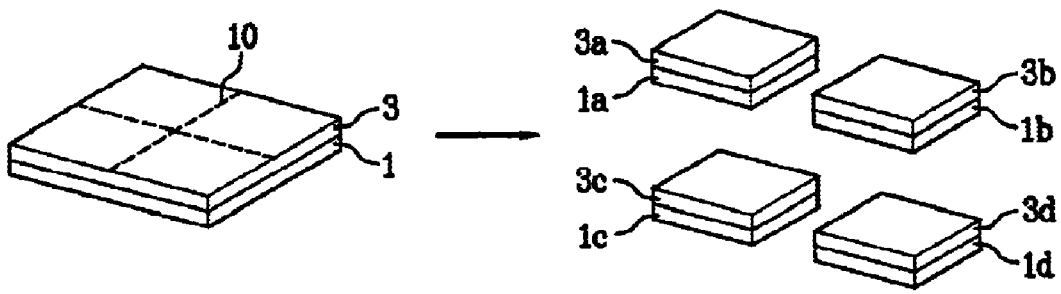
FIG. 2 illustrates a perspective view showing a related art cell cutting process.
Figure 3:
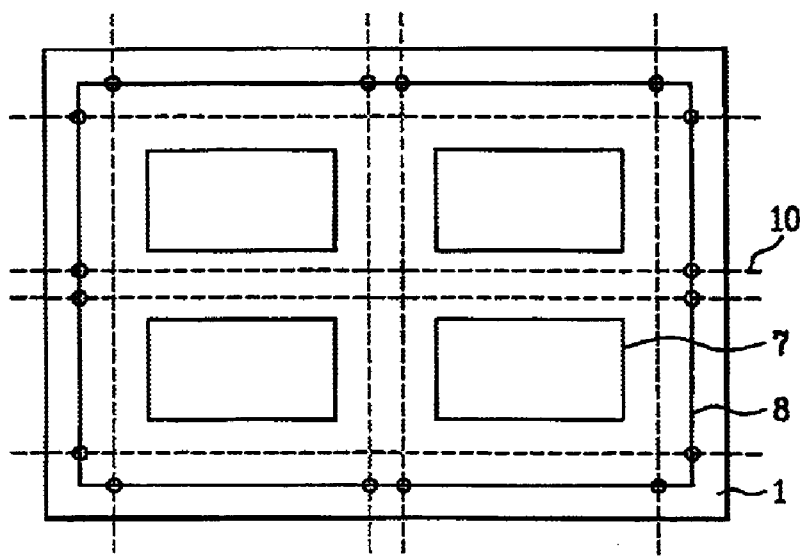
FIG. 3 illustrates a plane view showing a plurality of scribing lines and a sealant formed on the lower substrate of a related art LCD.
Figure 4A:
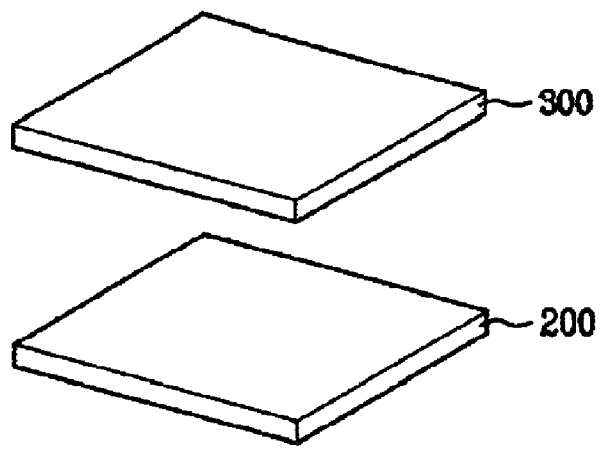
FIGS. 4A to 4E are expanded perspective views illustrating a method for fabricating an LCD panel according to a first embodiment of the present invention.

Referring to FIG. 4A, a lower substrate 200 and an upper substrate 300 are prepared for the process. A plurality of gate lines and data lines (both not shown) are formed on the lower substrate 200 to cross each other defining pixel regions, a thin film transistor having a gate electrode, a gate insulating film, a semiconductor layer, an ohmic contact layer, source/drain electrodes, and protection film, is formed at every crossing point of the gate lines and the data lines. A pixel electrode is further formed at each of the pixel regions connected to the thin film transistor.

An orientation film is formed on the pixel electrodes for an initial orientation of the liquid crystal. The orientation film may be formed of polyimide, polyamide group compound, polyvinylalcohol (PVA), polyamic acid by rubbing, or a photosensitive material, such as polyvinylcinnamate (PVCN) and polysilioxanecinnamate (PSCN). Alternatively, cellulosecinnamate (CelCN) group compound may be selected by using photo-alignment method.

A light shielding film is formed on the upper substrate 300 for shielding a light leakage from the gate lines, the data lines, and the thin film transistor regions. A color filter layer of red, green, and blue is formed thereon. A common electrode is formed thereon in this order. Additionally, an overcoat layer may be formed between the color filter layer and the common electrode. The orientation film is formed on the common electrode.

Silver (Ag) dots are formed at the outside of the lower substrate 200, for applying a voltage to the common electrode on the upper substrate 300 after the lower and upper substrates 200 and 300 are bonded with each other. Alternatively, the silver dots may be formed on the upper substrate 300.

In an in plane switching (IPS) mode LCD, a lateral field is induced by the common electrode formed on the lower substrate the same as the pixel electrode. The silver dots are not formed on the substrates.

Figure 4B:
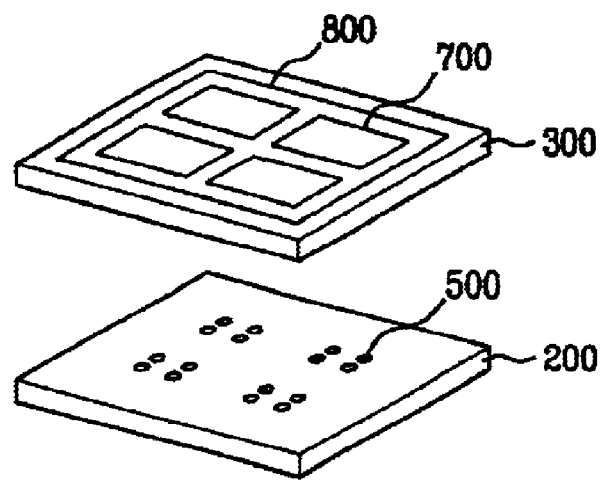

Referring to FIG. 4B, a main UV sealant 700 is coated on the upper substrate 300 in a closed pattern, and a dummy UV sealant 800 is formed at the outside of the main UV sealant 700 in a closed pattern. The sealant may be coated by using a dispensing method or a screen printing method. However, the screen printing method may damage the orientation film formed on the substrate since the screen comes into contact with the substrate. Also, the screen printing method may not be economically feasible due to a large amount of the sealant loss in a large substrate.

Then, the liquid crystal droplets 500 are placed onto the lower substrate 200 to form a liquid crystal layer. The liquid crystal may be contaminated when the liquid crystal meets the main sealant 700 before the main sealant 700 is hardened. Therefore, the liquid crystal droplets may have to be dropped onto the central part of the lower substrate 200. The liquid crystal droplets 500 dropped at the central part spread slowly even after the main sealant 700 is hardened, so that it is distributed evenly throughout the entire substrate with the same concentration.

FIG. 4B illustrates that both the liquid crystal droplets 500 and the sealants 700 and 800 are coated on the lower substrate 200. However, as an alternative in practicing the present invention, the liquid crystal droplets 500 may be formed on the upper substrate 300, while the UV sealants 700 and 800 may be coated on the lower substrate 200.

Moreover, the liquid crystal droplets 500 and the UV sealants 700 and 800 may be formed on the same substrate. However, the liquid crystal and the sealant may have to be formed on different substrates in order to shorten the fabrication time period. When the liquid crystal droplets 500 and the UV sealants 700 and 800 are formed on the same substrate, there occurs an unbalance in the fabricating process between the substrate with the liquid crystal and the sealant and the substrate without the liquid crystal. For example, the substrate may not be cleaned when the sealant is contaminated before the substrates are attached to each other since the liquid crystal and the sealant are formed on the same substrate.

Spacers may be formed on either of the two substrates 200 or 300 for maintaining a cell gap. The spacers may be sprayed at a high pressure onto the substrate from a spray nozzle mixed with ball spacers and a solution having an appropriate concentration. Alternatively, column spacers may be formed on portions of the substrate of the gate lines or data lines: The column spacers may be used for the large sized substrate since the ball spacers may cause an uneven cell gap for the large sized substrate. The column spacers may be formed of a photosensitive organic resin.

Figure 4C:
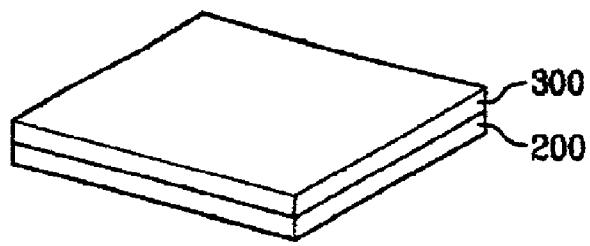

Referring to FIG. 4C, the lower substrate 200 and the upper substrate 300 are attached to each other. The lower substrate 200 and the upper substrate 300 may be bonded by the following processes. First, one of the substrates having the liquid crystal dropped thereon is placed at the lower side. The other substrate is turned by 180 degrees so that the side of the substrate at the upper side having layers faces into the upper surface of the substrate at the lower side. Thereafter, the substrate at the upper side is pressed, or the space between the substrates is evacuated, and releasing the vacuum, thereby attaching the two substrates.

Figure 4D:
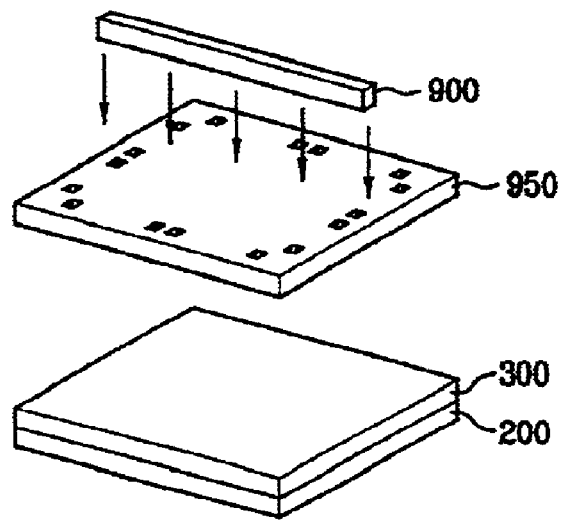

Then, referring to FIG. 4D, a mask 950 is placed between the attached substrates 200 and 300 and a UV irradiating device 900 for masking the overlapping region between the dummy UV sealant 800 and the scribing line. A UV ray is then irradiated thereon. Upon irradiating the UV ray, monomers or oligomers are polymerized and hardened, thereby bonding the lower substrate 200 and the upper substrate 300.

The region masked by the mask 950 is shaded from the UV ray, so that the dummy UV sealant at this region is not hardened. Thus, the dummy UV sealant remains an initial coating condition, i.e., fluidic condition, so that the cell cutting process after the bonding process becomes easy.

Monomers or oligomers each having one end coupled to the acrylic group and the other end coupled to the epoxy group mixed with an initiator are used as the UV sealants 700 and 800. Since the epoxy group is not reactive with the UV irradiation, the sealant may have to be heated at about 120° C. for one hour after the UV irradiation for hardening the sealant. However, even if the dummy sealant is eventually hardened by the thermal process, the hardening ratio drops below 50%, such that the dummy sealant gives no influence to the cell cutting process.

Figure 4E:
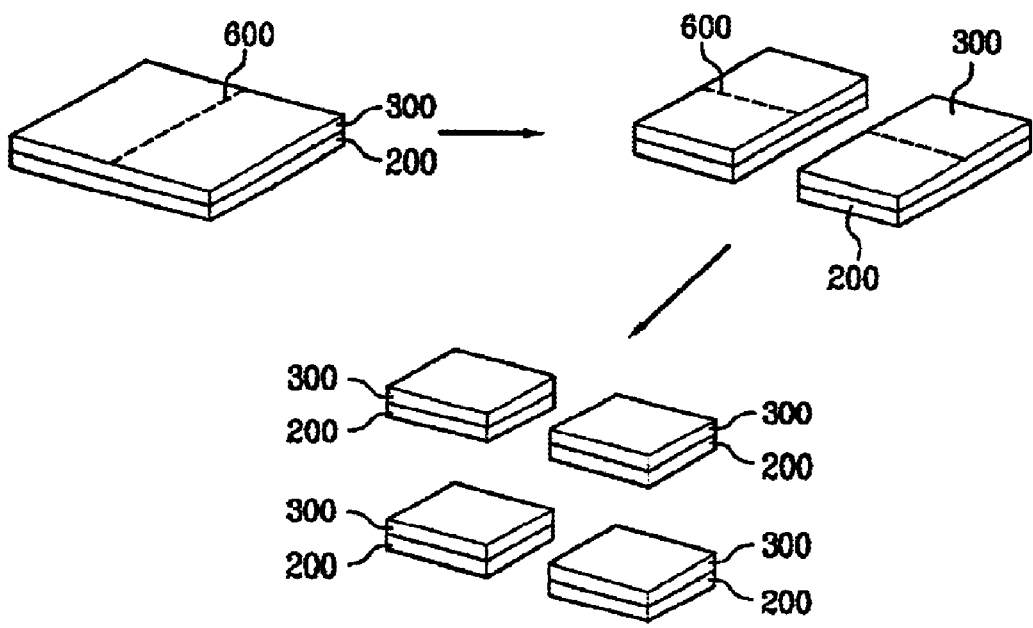

FIG. 4E illustrates that the bonded substrates are cut into the individual cells. In the cutting process, a cutting device of diamond such as a pen or a toothed wheel is used to cut the unit cells one by one along the scribing lines 600 by the simultaneous scribing and breaking processes. The use of the cutting device that can carry out the simultaneous scribing and breaking processes may reduce both the space occupied by the device and the cutting time period.

A final inspection (not shown) is carried out after the cutting process. In the final inspection, presence of defects is determined before the substrates cut into the unit cells are assembled, by examining an operation condition of the pixels when a voltage applied thereto is turned on/off.

Figure 5A:
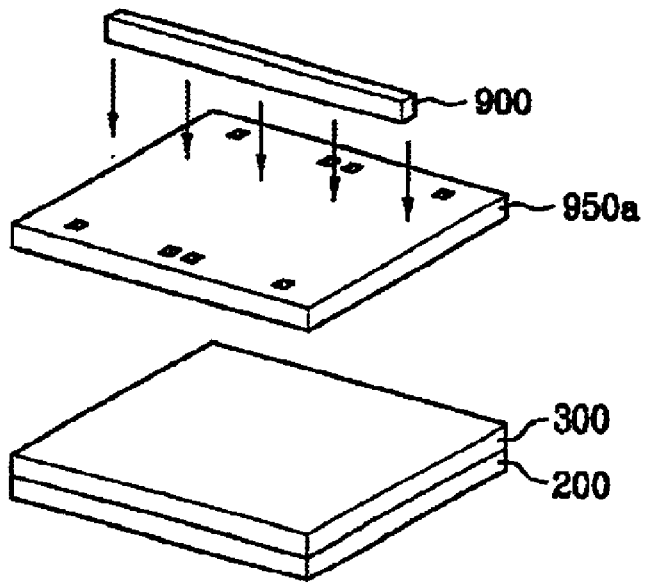
FIGS. 5A to 5C are perspective views to illustrate the process of UV irradiation in a method for fabricating an LCD according to a second embodiment of the present invention.
Figure 5B:
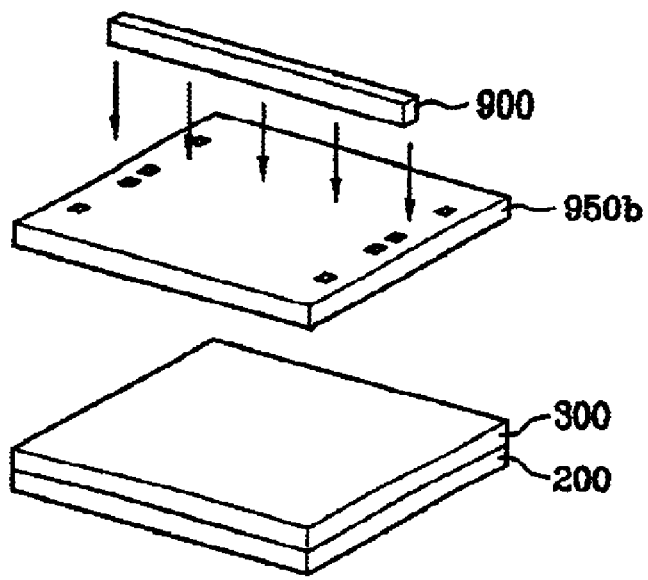
Figure 5C:
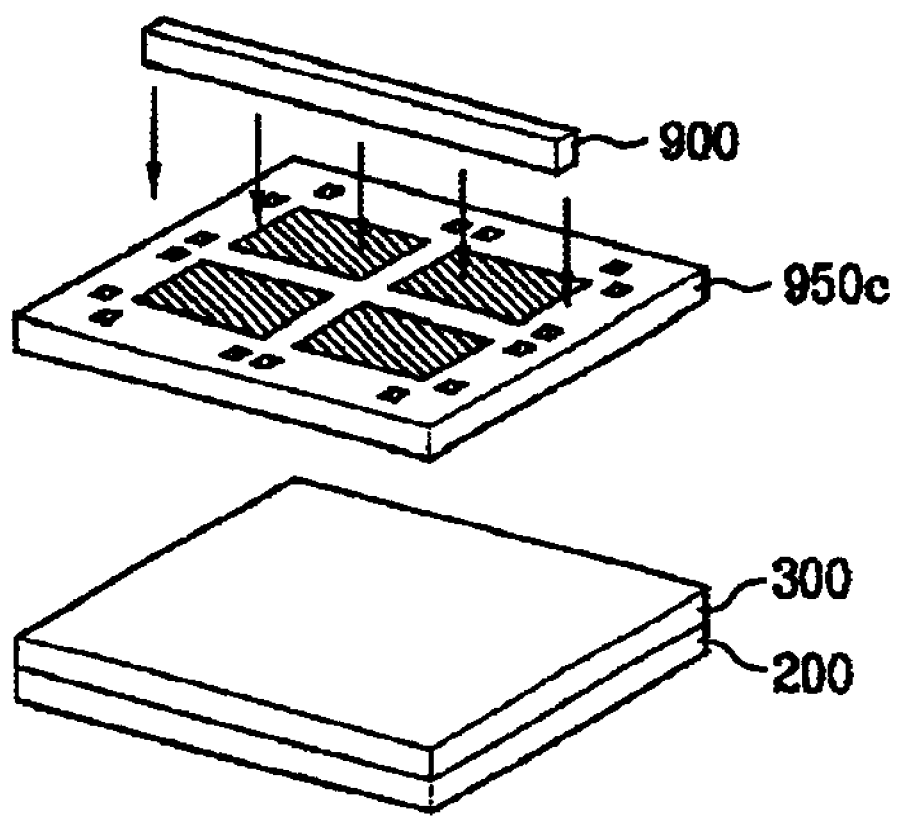

FIGS. 5A to 5C illustrate expanded perspective views each showing the UV irradiation process in the fabricating method of an LCD in accordance with a second embodiment of the present invention. All the fabricating process is similar to the first embodiment except for the UV irradiation process.

In the simultaneous scribing and breaking processes, when the substrates are cut in up and down directions starting from the scribe line at the end of the right or left side, the dummy UV sealant on the right or left side may be removed. Therefore, the removed dummy UV sealant gives no influence to the following cell cutting process.

Accordingly, the same result may be obtained in with masking the cell cutting process even if the UV ray is irradiated after upper and lower side regions of the dummy UV sealant overlapped the scribing lines, or only left and right side regions of the dummy UV sealant overlapped the scribing lines.

FIG. 5A illustrates the UV irradiation process, with masking only upper and lower side regions of the dummy UV sealant overlapping the scribing lines by using a mask 950a. FIG. 5B illustrates the UV irradiation process, with masking only left and right side regions of the dummy UV sealant overlapping the scribing lines by using the mask 950a. FIG. 5A is applicable to an embodiment where upper and lower end portions are cut first, while FIG. 5B is applicable to an embodiment where left and right end portions are cut first.

FIG. 5C illustrates a perspective view showing the UV irradiation process in the method for fabricating an LCD in accordance with a second embodiment of the present invention.

In the UV irradiation, if UV is irradiated to the entire surface of the attached substrates, the UV ray may deteriorate device characteristics of the thin film transistors on the substrates, and change a pre-tilt angle of the orientation film formed for the initial orientation of the liquid crystal.

Therefore, in FIG. 5C, the second embodiment of the present invention suggests irradiating the UV after a mask 950c is placed between the attached substrates 200 and 300 and the UV irradiating device 900, for masking the regions where the dummy UV sealant 800 and the scribing lines are crossed, and the active regions inside the main UV sealant 700.

As has been explained, the method for fabricating a liquid crystal display panel of the present invention has the following advantages.

The UV irradiation with masking the crossed regions of the dummy UV sealant and the scribing lines makes cell cutting by the simultaneous scribing and breaking processes easier since the dummy UV sealant on the scribing lines is not hardened.

The UV irradiation with masking the active regions in the main UV sealant prevents the UV irradiation from deteriorating characteristics of the thin film transistors, orientation films, and the like, formed on the substrates.

It will be apparent to those skilled in the art that various modifications and variations can be made in the method for fabricating an LCD panel of the present invention without departing from the spirit or scope of the inventions. Thus, it is intended that the present invention covers the modifications and variations of this invention provided they come within the scope of the appended claims and their equivalents.

What is claimed is:

1. A method for fabricating a liquid crystal display panel, comprising:
    forming a main UV sealant to surround a plurality of unit cells and a dummy UV sealant on either one of first and second substrates, the dummy UV sealant formed at an outside of the main UV sealant;
    dropping at least one droplet of liquid crystal onto either one of the first and second substrates;
    attaching the first and second substrates;
    irradiating a UV ray on the attached substrates with masking regions where the dummy UV sealant and at least one scribing line are crossed, thereby bonding the substrates; and
    cutting the bonded substrates into a plurality of unit cells.

2. The method of claim 1, wherein the masking regions in the irradiating a UV ray on the attached substrates includes masking upper and lower side portions of the crossed regions between the dummy UV sealant and the scribing line.

3. The method of claim 1, wherein the masking regions in the irradiating a UV ray on the attached substrates includes masking left and right side portions of the crossed regions between the dummy UV sealant and the scribing lines.

4. The method of claim 1, wherein the masking regions in the irradiating a UV ray on the attached substrates includes masking an active region inside the main UV sealant in addition to masking upper and lower side portions of the crossed regions between the dummy UV sealant and the scribing lines.

5. The method of claim 1, wherein the masking regions in the irradiating a UV ray on the attached substrates includes masking left and right side portions of the crossed regions between the dummy UV sealant and the scribing lines.

6. The method of claim 1, further masking an active region inside the main UV sealant.

7. The method of claim 1, wherein the main and dummy UV sealants include one of monomer and oligomer each having both ends coupled to an acrylic group.

8. The method of claim 1, wherein the main and dummy UV sealants include one of monomer and oligomer each having one end coupled to an acrylic group and the other end coupled to an epoxy group.

9. The method of claim 1, further comprising heating the UV ray irradiated substrates with masking crossed regions between the dummy UV sealant and the scribing lines, wherein the main and dummy UV sealants include one of monomer and oligomer each having one end coupled to an acrylic group and the other end coupled to an epoxy group.

10. The method of claim 1, wherein the scribing line is formed on the bonded substrates.

11. The method of claim 1, wherein the cutting the bonded substrates into a plurality of unit cells is performed by scribing and breaking simultaneously.

12. The method of claim 1, further comprising forming at least one column spacer on the first substrate.

13. The method of claim 1, wherein the main and dummy UV sealants are formed on the first substrate, and the at least one droplet of liquid crystal is dropped onto the second substrate.

* * * * *